Aug. 11, 1953     O. G. LANDSVERK     2,648,777
QUARTZ FIBER DOSIMETER

Filed July 11, 1950     2 Sheets-Sheet 1

INVENTOR.
BY *Ole G. Landsverk*

Aug. 11, 1953    O. G. LANDSVERK    2,648,777
QUARTZ FIBER DOSIMETER
Filed July 11, 1950    2 Sheets-Sheet 2

INVENTOR.
BY Ole G. Landsverk

Patented Aug. 11, 1953

2,648,777

UNITED STATES PATENT OFFICE 2,648,777

QUARTZ FIBER DOSIMETER

Ole G. Landsverk, Mount Healthy, Ohio

Application July 11, 1950, Serial No. 173,131

4 Claims. (Cl. 250—83.3)

This invention relates to dosimeters of the type that are carried by persons who may be exposed to either X-ray or gamma ray radiation, by means of which such persons may ascertain the quantity of radiation in roentgens or in milliroentgens which they have received during the time of exposure. More particularly, the invention relates to so called low roentgen range dosimeters of the type that have built into them a quartz fibre electrometer so that, once they are charged by means of an auxiliary instrument called a charger, they indicate independently by the position of the fibre image on an eyepiece reticle the total accumulated dosage to which they have been exposed since they were last charged.

This type of instrument has now been available commercially for several years in a number of models. All are basically similar in structure. Therefore to clearly distinguish what I claim as novel from what is previous art, a brief general description of the structure of a dosimeter will be given here. Later on in the specifications specific novel features will be pointed out.

All dosimeters comprise a low power microscope which is mounted rigidly in a tube so that it is in focused relation with the movable, central portion of a quartz fibre. The quartz fibre is covered with a platinum coating so as to render it conducting. The fibre is attached to a wire frame so that it is in an inverted U-shaped position. A portion of the wire frame is roughly parallel with the fibre so that when the fibre and frame are charged the fibre is repelled from the frame and attracted to the adjacent grounded wall of the tube in which the microscope and fibre support frame are mounted. As a result the fibre is caused to move across the field of view of the microscope as the potential of the quartz fibre and fibre support frame is varied. The above described quartz fibre assembly belongs to a class of instruments or components of instruments known as quartz fibre electrometers of which this is a peculiarly simple and shockproof member. It is capable of rigid mounting in a restricted space. (Some authorities classify this structure as an electroscope rather than an electrometer but that is a mere matter of definition and of no importance to this discussion.)

The wire frame of the quartz fibre electrometer is mounted rigidly by means of a polystyrene insulator. The insulator is usually molded and a portion of the wire frame is molded into it so that the insulator provides a rigid support. Such insulators may have as high as $5 \times 10^{20}$ ohms of resistance and must have about $10^{19}$ ohms in order to keep leakage of charge from the electrometer over a 24 hour period down to an acceptable quantity.

Means are provided for contacting the support frame of the electrometer in order to charge it. This is done by permitting a portion of the wire support frame to project below the insulator. Charging is then done by touching the charged electrode of the socket of the charging box to this projecting portion by inserting the barrel of the dosimeter into the socket. The charging box is provided with a potentiometer by which the potential that is applied to the electrometer is adjusted to the correct value for charging, or if an electrostatic friction charger is used no potentiometer is needed.

Light must be provided to illuminate the portion of the quartz fibre on which the microscope is focused. This light must then pass through the objective lens and suitable apertures of the microscope and illuminate the eyepiece reticle as well as throw a focused image of the fibre on the reticle in the eyepiece. In all dosimeters that have been designed to date, this has been done by admitting the light at the lower end of the barrel through a window in the dust cap which serves as a removable closure for the lower end of the barrel, or, if the meter is sealed, through the transparent flexible diaphragm which holds a charging pin out of contact with the quartz fibre electrometer until the charging electrode in the socket of the charging box is caused to apply force to the pin so that the diaphragm flexes and contact is made. After the light has entered the meter in this manner, it passes along the axis of the dosimeter and through the transparent molded insulator above mentioned or through a hole in the said insulator. The light then illuminates the fibre and passes through the microscope as previously described.

In all dosimeters the sensitivity of the instrument is governed by several factors. The volume of the air chamber in which the quartz fibre electrometer is housed will determine the total quantity of ionization that a given radiation dosage will produce and hence, assuming no recombination of ions, the total quantity of negative charge which will be collected by the positively charged electrometer and which partially discharges it. The electrostatic capacitance of the electrometer will then determine the drop of poential which the electrometer will experience due to this loss of charge. The length and diameter of the fibre, and the geometry of the fibre and of the charged and uncharged objects which surround it will determine the sensitivity of the fibre, for example in volts of change of potential per millimeter of fibre motion. The power of the objective of the microscope and the length of the reticle in the microscope eyepiece in turn determine the effective sensitivity of the instrument in volts for full scale. This can, of course, be transformed by retracing the steps outlined above into roentgens or milliroentgens of X or gamma radiation for full scale.

Most, if not all, currently available low range dosimeters require 200 milliroentgens (mr.) for full scale.

It is an object of this invention to provide a dosimeter in which the conventional metal shell which serves as the barrel of the instrument is replaced by a conducting plastic barrel with resulting advantages which will be detailed later.

It is a further object of this invention to provide a dosimeter in which by its novel construction the assembly and adjustment is simpler and less expensive than heretofore and which is more shock-resistant and less subject to damage from exposure to humid conditions, and from extremes of temperature than any which has heretofore been known.

It is a further object of this invention to provide a dosimeter which has a microscope which is assembled as a unit and that may slide inside the barrel of the dosimeter until it is in proper focused relationship with the quartz fibre of the electrometer and may be cemented in place in this position thus providing an exceptionally simple method of attaining and maintaining said proper focused relationship.

It is a further object of this invention to provide a mounting for the reticle of the eyepiece of the microscope such that inexpensive reticles which are recorded on film by a photographic process, may be used without a possibility of the reticle sagging out of the focal plane of the eyepiece lens and without danger that the sun rays focused on the reticle by the eyepiece lens will damage the reticle in any way.

It is a further object of this invention to provide an all plastic microscope so that assembly of the unitary microscope as above described may be simply and desirably attained by solvent welding the parts together and so that said microscope will have a coefficient of expansion which is approximately the same as the coefficient of expansion of the plastic barrel in which the microscope is mounted so that extremes of heat or cold will not cause loosening of the microscope by differential expansion. Other advantages of the all plastic microscope will be made clear in what follows.

It is a further object of this invention to provide a quartz fibre electrometer in which the insulator is in one unitary assembly with a cylindrical flange which slips inside the plastic barrel of the dosimeter so that the electrometer may be quickly inserted into the barrel and removed for inspection, for adjustment and for removal of dust particles and lint until such time as it is cemented into place in the final assembly.

It is also an object of this invention to provide a dosimeter in which the light for the microscope is admitted through a window in the side of the barrel. Thus removing the necessity of providing suitable passage for the light through the dust caps, sealed diaphragms and insulators and past the charging pins and other objects which restrict the free passage of light through the lower end of the barrel.

The foregoing and other objects of the invention will be apparent from the following description taken in conjunction with the accompanying drawings in which.

Throughout the drawings and the specification like reference characters indicate like parts.

Figure 1:
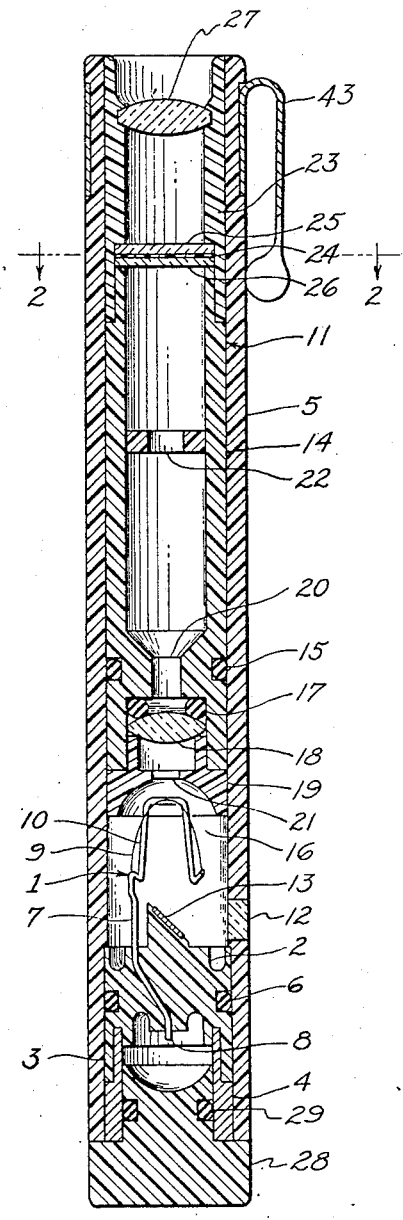
Figure 1 is a view in vertical section drawn to enlarged scale of a direct reading dosimeter arranged and constructed in accordance with an embodiment of the invention.
Figure 3:
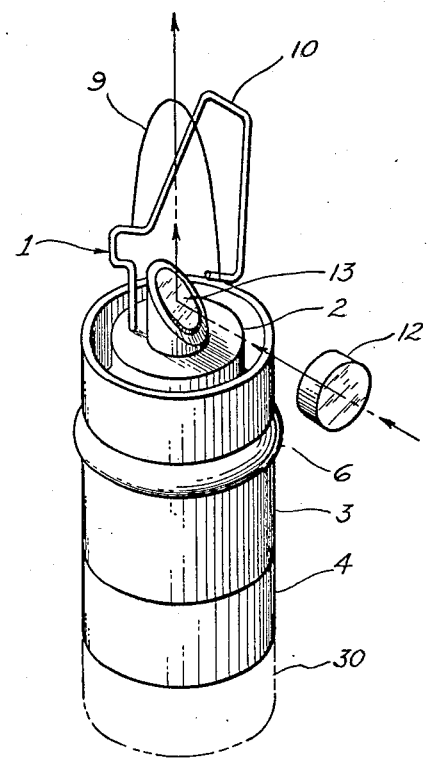
Figure 3 is a view in perspective of an insulator and quartz fibre electrometer assembly.

The support for the electrometer assembly 1 of the dosimeter as shown in Figures 1 and 3 consists of an insulator 2 and a sleeve 3 which may be reenforced at its lower extremity with the conductive sleeve 4. Parts 2, 3 and 4 are preferably molded into one integral unit. This unitary assembly is slipped into tubular member 5 and is pushed against a shoulder within said member as shown in Figure 1 where it is securely cemented into position. O-ring 6 provides a positive airtight seal. Insulator 2 is of polystyrene and must have a resistance of at least $10^{19}$ ohms.

The electrometer assembly comprises a wire support frame 7, the lower end of which is molded into insulator 2 so that its lower end 8 projects below the insulator, is coaxial with the insulator, and serves as a contact for charging the quartz fibre electrometer. A fine quartz fibre 9 is attached to portions of wire support frame 7 so that it assumes an inverted U shape, the plane of which in the uncharged state is approximately parallel to the plane of a section 10 of the wire support frame. The fibre is made conducting by a well known process which is known as sputtering. The planes of quartz fibre 9 and section 10 of the wire support frame are inclined with respect to the axis of the tubular member 5 as shown in Figure 3 so that when a suitable variable voltage is applied to the insulated system the fibre is repelled from section 10 of the wire support frame so that the tip of the fibre loop will swing across the axis of the tubular member 5. Its image will then travel along the scale in the eyepiece of the microscope 11.

Light for illuminating the microscope is admitted through transparent window 12. It reflects from a small mirror 13 which is molded into the insulator at a 45 degree angle so that the reflected light travels along the axis of the microscope.

The microscope 11 consists of a tubular plastic molded chassis 14, which fits snugly within tubular member 5. O-ring 15 is so mounted in a groove at the lower end of the chassis 14 that it hermetically seals the upper end of the ionization chamber 16 in which the quartz fibre electrometer 1 is housed. At the same time it serves as a cushion mounting and centering device for the lower end of the microscope. The lower end of chassis 14 is provided with a cylindrical socket which is coaxial with the chassis and in which are supported O-ring 17, objective lens 18 and conducting sleeve 19, a projecting portion of which serves as the upper end of the ionization chamber. Chassis 14 has a constricted portion 20 and conducting sleeve 19 has a constricted portion 21 which serve as apertures above and below objective lens 18. Chassis 14 likewise is provided with an aperture 22 the opaque outer ring of which blocks stray light which reflects from the inner surface of chassis 14. O-ring 17 serves to provide force against the edge of objective lens 18 to hold it in position.

A sleeve at the upper end of chassis 14 slips inside a sleeve on the lower end of plastic molded eyepiece tube 23. These are slipped together and solvent welded so that they hold securely photographic film reticle 24 between glass discs 25 and 26 so the film remains flat. Disc 25 may be made of heat absorbent glass. Not only will the scale lie flat but it is protected from damage by the sun's rays that may be focused on it by the eyepiece lens.

Eyepiece tube 23 is provided with a shoulder near the upper end. When the eyepiece lens 27 rests on this shoulder the scale 24 is in focused relation with it. A second shoulder immediately above the lens provides plastic material which may be melted down over the edge of the lens by means of a properly shaped hot iron thus holding the lens securely.

When the quartz fibre electrometer 1 has been properly adjusted, positioned and secured by cementing sleeve 3 into the lower end of the tubular member 5, the microscope 11 is moved into suitable focused relation with the fibre of the electrometer and is cemented in this position.

A clip 43 is snapped into a groove near the upper end of tubular member 5 so that the instrument may be fastened securely to the clothing. At the lower end of the barrel an airtight closure is provided by dust cap 28 and O-ring 29 which is mounted in an annular groove in the portion of the dust cap which slips inside tubular member 5. A shallow groove may be cut on the inner surface of sleeve 4 near its outer end so that O-ring 29 fits into this groove when the dust cap is in position. Thus an airtight seal is provided and the O-ring has a secure grip on the inside of the sleeve.

Figure 2:
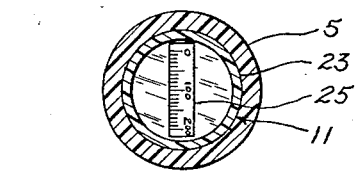
Figure 2 is a view in section taken on line 2—2 of Figure 1, and showing the reticle of the eyepiece in plan view.

Figure 2 shows a section along 2—2 of Figure 1. Photographic film reticle 24 consists of an opaque outer portion. At its center is a clear rectangular portion in which the scale markings appear as black lines.

Figure 3 shows a view in perspective of the assembly of the quartz fibre electrometer 1, insulator 2 and sleeves 3 and 4. An extension 30 of sleeve 4 is provided. The purpose of the flange is to manipulate the assembly in adjusting, mounting and cementing it into the tubular member 5. The flange is cut off when the cemented joint is sufficiently strong.

Figure 4:
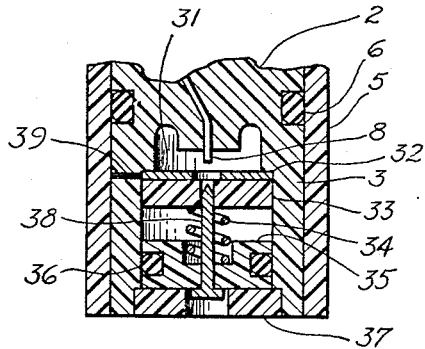
Figure 4 is a sectional view of a sealing mechanism by means of which the instrument may be charged without breaking the seal.

Figure 4 shows in section a hermetic seal which need not be broken when the instrument is being charged. The insulator 2 and sleeve 3 are the same as described above except that the recess in the inner portion of sleeve 3 is smaller. A conducting disc 31 with a small hole at its center sets against a shoulder 32 at the lower end of the insulator. It is held in place by insulating disc 33, compression spring 34 and piston 35 which is provided with O-ring seal 36. This entire assembly is held in place by plastic retaining washer 37 which is solvent welded into the recess in sleeve 3. A contact pin 38 is secured to the center of piston 35, passes along the axis of spring 34 and is guided at its upper end by a bearing hole along the axis of disc 33.

It is apparent that if the instrument is inserted in the socket of a charging mechanism so that the charged electrode of the charging mechanism exerts a force against the head of pin 38, in a direction that is along the axis of the pin, spring 34 will be caused to compress so that pin 38 moves forward and touches the contact 8 of the quartz fibre electrometer. The instrument may then be charged. As the pin 38 again recedes when charging is completed the electrostatic field of the upper end of the pin will be blocked off by the shielding effect of disc 31 so that the voltage of the electrometer is but slightly affected by the removal of the pin and subsequent discharge thereof. To make conducting disc 31 effective as an electrostatic shield for the electrometer, it must be grounded to tubular member 5. A conducting path 39 is provided for the purpose. It is noted that when pin 38 is in its normal position, disc 31 is about midway between contact 8 and the upper end of pin 38. This provides optimum shielding.

Figure 5:
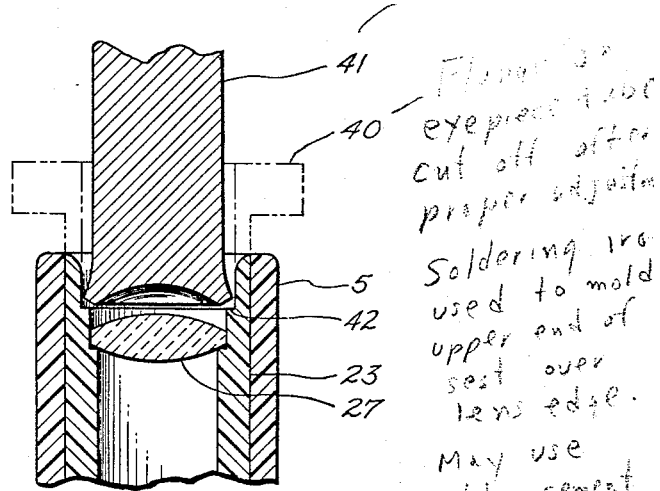
Figure 5 is a section showing how the microscope is manipulated during focusing and assembly operations and how the eyepiece end of the dosimeter is eventually finished. It also shows how a shoulder of polystyrene is molded around the edge of the eyepiece lens to secure it.

Figure 5 shows in section the upper end of microscope eyepiece tube 23. For purposes of manipulation such as sliding into tubular member 5, focusing the objective lens on the quartz fibre and turning so the fibre image and scale assume their proper relative positions, a flange 40 is molded integrally with tube 23. When the microscope has been cemented into place, this flange is cut off in a lathe and the end of the dosimeter internally of tubular member 5 and above eyepiece lens 27 is shaped as desired as shown in Figure 5.

To secure the eyepiece lens 27 the tip of a soldering iron 41 is shaped so that when its temperature is properly regulated and it is brought to bear on the polystyrene shoulder 42 it will mold the shoulder around the edge of the lens 27 thus holding it securely.

If rubber cement is applied to the shoulder on which the lens 27 seats and permitted to dry before installing the lens, a watertight seal is assured.

Figure 6:
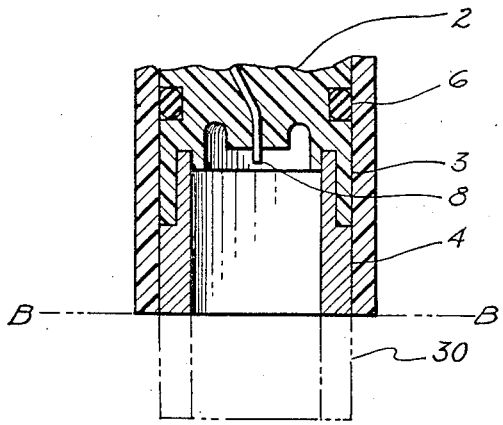
Figure 6 shows the means by which the electrometer-insulator unit is manipulated and how the lower end of the barrel is eventually finished.

Figure 6 shows how the electrometer-insulator assembly originally is provided with an extension 30 of conducting reenforcing sleeve 4 by means of which the assembly is manipulated. This is subsequently cut off along line B—B.

A preferred embodiment of this invention is as follows: Conducting tubular member 5 is a cylindrical tube of about $\frac{3}{8}$ inch inside diameter, $\frac{1}{2}$ inch outside diameter and about $3\frac{5}{8}$ inches long. Chassis 14 and eyepiece tube 23 are molded of black polystyrene. The double-convex eyepiece lens 27 has a diameter of about $\frac{9}{32}$ inch and a focal length of about 12 mm. The scale 24 is from 3 to 4 mm. long. Chassis aperture 22 is a black polystyrene ring of $\frac{3}{16}$ inch inside diameter solvent welded about midway between objective lens 18 and scale 24. O-ring 15 is $\frac{3}{8}$ inch in diameter with a $\frac{1}{16}$ inch section diameter and O-ring 17 is $\frac{1}{4}$ inch in diameter and has a $\frac{1}{16}$ inch section diameter. The objective lens 18 is double-convex and has a focal length of about 7.5 mm. Sleeve 19 is a slip fit into the socket in chassis 14 and is cemented into it so O-ring 17 and objective lens 18 are under compression.

The fibre 9 for the quartz fibre electrometer is about 1/16 inch long and 5 microns in diameter. The support wire 7 on which it is supported is of Phosphor bronze wire of .025 inch diameter. It is molded so it is offset at the top of the insulator to make room at the axis of the insulator for mirror 13. At the lower end of the insulator, contact 8 of the wire support frame is coaxial with tubular member 5. Mirror 13 is 3/32 inch in diameter and is chrome plated and polished. Clear window 12 is molded of polystyrene and is 1/8 inch in diameter. Insulator 2 as well as sleeve 3 are molded integrally of clear polystyrene. The insulator must show a resistance of $5 \times 10^{19}$ ohms or over. O-ring 6 is 3/8 inch in diameter and has a section diameter of 1/16 inch. It hermetically seals ion chamber 16 from below. Conducting reenforcing sleeve 4 is molded integrally with sleeve 3. The entire electrometer-insulator assembly is cemented into place with mirror 13 oriented so it faces window 12 after the electrometer has been fabricated and adjusted by methods well known to the art so that the section of the fibre which is viewed by the microscope travels in a direction that is perpendicular to the axis of tubular member 5 as it crosses this axis and so that the viewed section of the fibre remains parallel to itself in the various positions in which it is visible in the microscope.

When the insulator-electrometer assembly has been cemented into place the microscope is pulled a short distance out of tubular member 5 and cement is applied to the exposed portion. The microscope is then pushed back into focused relation with the fibre so that the fibre image is at all times parallel with the scale markings and the cement is permitted to set. The projecting flanges at both ends of the tubular member 5 are then trimmed off and the ends shaped as shown in Figures 1, 5 and 6.

Before the meter is assembled in the manner that is described above, the insulator is checked for leakage by charging the electrometer and noting the amount of discharge over a 24 hour period with no radiation present. This should not exceed 2% of full scale. The unit is then calibrated by exposing to a dose of 100 milliroentgens of gamma rays. If it was started at the zero point of the scale, the fibre image should then be at the 100 mr. or midpoint. If, for example, the reading instead is 106 mr., a new microscope is substituted in which the scale length is 6% greater than the scale length with which the instrument was calibrated. Recalibration with the new scale should then give a reading very close to the desired 100 mr. A series of scale sizes that vary in length in steps of 2% are provided for this purpose.

The dust cap 28 is molded of conducting plastic, and the O-ring 29 is 3/8 inch in diameter and has a 1/16 inch section diameter.

The following features are believed to be novel and desirable.

1. The tubular member 5 is made of conducting plastic. This has much more nearly the same coefficient of expansion as the plastic parts that are fitted into it so that severe changes in temperature will not as readily open up cemented joints and seals by the effects of differential expansion. In addition the entire wall thickness of the ionization chamber 16, Figure 1, is plastic the average atomic number of whose composition is low whereas the ionization chamber walls of all dosimeters that have been known to date have been partly or wholly of metal. Materials in the chamber wall of an average atomic number about 7.2, which is the average atomic number of air, make the instrument give more accurate readings as the energy of the radiation that is measured is varied from soft X-rays of about 75 kilovolts to gamma rays of one million electron volts or over. This is according to principles well known to the art.

2. The microscope is an integral unit. Instead of the microscope being packed into the dosimeter barrel as many discreet parts with enhanced opportunity for looseness, shifting of parts and the entrance of dust and dirt as has been done heretofore, the dosimeter here described has a microscope which is all plastic and is cemented or solvent welded together as an integral unit. Besides largely eliminating troubles that are mentioned above, this permits focusing the microscope by the simple operation of sliding it inside the dosimeter barrel where it can be cemented permanently into position. Up to date focusing has been done by threading the insulator that holds the quartz fibre electrometer or by a system for loading thin washers under the objective lens (which is in that case located in a socket at the upper end of a separate ionization chamber tube that slides inside the metal barrel of the dosimeter) until by trial and error an approximate focus is had.

3. The O-ring seals at both ends of the ionization chamber. These are easy to install and more certain to seal than the process of peening the thinned ends of the metal barrel over a plastic thimble which has been resorted to up to date or the thin gaskets which are used in some models between the eyepiece and the barrel and between the lower end of the barrel and a shoulder on the dust cap which thin gaskets are easily squeezed out of position.

In addition the O-ring, particularly the one at the lower end of the microscope, serves as a shock-proofing and centering device. When it is considered that these instruments must withstand a four foot drop to concrete without appreciable movement of the fibre and that a thousandth of an inch of relative sidewise motion of the fibre and objective lens is about the total permissible motion it is seen that this is an important consideration. O-rings have not been used for this purpose or in this manner heretofore.

4. The use of glass discs on each side of the scale permits the use of film since it overcomes the two main objections to film—(1) it forces the film to lie flat and hence remain in sharp focus and (2) the glass has enough heat capacity and thermal conductivity and is in such intimate contact with the film so that focusing the noonday mid-summer sun on the scale by means of the eyepiece lens will not damage the scale. Added protection is had by using heat absorbent glass for the upper glass disc. Film reticles are desirable because they are far less expensive and are more versatile than other types since at very low cost the design or length of the scale may be changed. There is no investment for silk screen or other patterns or need for engraving on glass or other expensive processing.

5. Mounting the eyepiece lens by providing a shoulder of polystyrene inside the eyepiece tube as shown in Figure 5 is a simple and desirable method which is available once a suitable thermoplastic eyepiece tube and suitable construction is used. The lens is securely and neatly held and by using a priming coating of rubber cement at the seat of the lens the joint is waterproof.

6. The light is admitted by a window at the side of the dosimeter barrel and is reflected by a mirror which is molded in a suitable position at the upper end of the insulator. This is an important innovation because it introduces the light in a simple manner so that the parts below the mirror may be simply designed to perform their other functions and need not be distorted in order to permit light to pass through them as has always been done heretofore. For example, the dust cap has no window but is solid and the insulator 2 and sleeve 3 are designed for good insulation and to permit easy charging of the meter and not for transmitting light. Likewise the sealing mechanism shown in Figure 4 would not be feasible if it had to transmit light for the microscope and the charging unit, which is described in a co-pending application and which is needed to charge the dosimeter, need have no provision for passing light along the axis of the charging electrode and so along the axis of the dosimeter as has been necessary heretofore. The window which I have provided at the side of the barrel admits light also during the charging process with no interference from the charging unit.

7. The electrometer 1, the insulator 2 and the sleeve 3 and reenforcing metal sleeve 4 are molded into an integral unit so that it may be slipped into place, checked, withdrawn, adjusted, cleaned and reinserted very easily. This is a great convenience as compared with methods used heretofore. These, in one case, involve a tedious threading of twenty turns or so to insert and the same number of turns to remove with consequent danger of dust coming loose inside the chamber and involving at times 200 turns or more for adjustment. A second system now in use seals the insulator and electrometer into a separate plastic ionization chamber which slips inside the metal barrel of the dosimeter. Once so sealed the electrometer cannot be removed or cleaned in case dust or lint find their way into the chamber.

8. The simple sealed system for charging the dosimeter as shown in Figure 4 is possible because no need exists for transmitting light through it. O-ring 36 will not wear out and if it is lubricated with the proper grade of selicone grease, will function at extremes of temperature without mechanical failure and without breaking the seal. Since piston 35 and sleeve 3 are both of molded polystyrene, there will be little or no differential expansion for the O-ring to compensate for.

Now therefore what I claim is:

1. In a dosimeter having a housing containing an electrometer supported by an insulator and a unitary microscope for viewing the electrometer, support means comprising a first O-ring composed of a resilient material located between the insulator and the housing for providing a shock-proof centering means for the electrometer, and a second O-ring composed of a resilient material located between the microscope and the housing for providing a shock-proof centering means for the microscope.

2. In a dosimeter having a cylindrical opaque housing containing an electrometer supported by an insulator and a microscope for viewing the electrometer, the combination of a mirror located on the side of the insulator which is adjacent to the electrometer, and a transparent window located in the cylindrical wall of the housing for admitting light to the mirror.

3. A dosimeter comprising a first hollow cylinder composed of an opaque conductive plastic, an electrometer, an insulator connected to the electrometer and located within said first cylinder near one end thereof for supporting the electrometer within the cylinder, the charging terminal of the electrometer being located near said one end of the hollow cylinder, a first O-ring composed of a resilient material located between the insulator and the hollow cylinder providing an air-tight seal between the insulator and the hollow cylinder and further providing a shock-proof centering means for the insulator, a second cylinder composed of a plastic and having an outer diameter which is substantially the same as the inner diameter of the first member, the second cylinder being located within the first cylinder, a microscope located within the second cylinder, a second O-ring composed of a resilient material located between the first and second cylinders near the end of the second cylinder which is adjacent to the electrometer, the second O-ring providing an air-tight seal between the two cylinders and further providing a shock-proof centering means for the microscope, a mirror located on the side of the insulator which is adjacent to the electrometer and inclined approximately 45° with respect to the axis of the first cylinder, and a transparent window composed of a plastic located in an aperture in the wall of the first cylinder, the axis of the window being disposed at approximately a 45° angle with respect to the reflecting face of the mirror.

4. A dosimeter comprising a first hollow cylinder composed of an opaque conductive plastic, an electrometer, an insulator connected to the electrometer and located within said first cylinder near one end thereof for supporting the electrometer within the cylinder, the charging terminal of the electrometer being located near said one end of the hollow cylinder, a first O-ring composed of a resilient material located between the insulator and the hollow cylinder providing a shock-proof centering means for the insulator, a second cylinder composed of a plastic and having an outer diameter which is substantially the same as the inner diameter of the first cylinder, the second cylinder being located within the first cylinder, a microscope located within the second cylinder, a second O-ring composed of a resilient material located between the first and second cylinders near the end of the second cylinder which is adjacent to the electrometer, the second O-ring providing a shock-proof centering means for the microscope, and means for admitting light to the inside of the first cylinder to illuminate the electrometer.

OLE G. LANDSVERK.

References Cited in the file of this patent

UNITED STATES PATENTS

| Number | Name | Date |
|---|---|---|
| 1,714,664 | Foster | May 28, 1929 |
| 1,933,063 | Kolhorster | Oct. 31, 1933 |
| 2,022,117 | Lauritsen | Nov. 26, 1935 |
| 2,465,886 | Landsverk et al. | Mar. 29, 1949 |
| 2,573,999 | Victoreen | Nov. 6, 1951 |
| 2,594,660 | Lauritsen | Apr. 29, 1952 |

OTHER REFERENCES

Ryerson Pocket Meter—MDDC 886, January 17, 1947, pp. 1–8.

Pocket Meters (Dosimeters) and Pocket Chambers, Landsverk, MDDC 395, December 13, 1945, pages 1–8.

"A Survey Meter," Landsverk, MDDC 396, April 22, 1946, pp. 1–11.